United States Patent
Etou et al.

(10) Patent No.: US 8,182,697 B2
(45) Date of Patent: May 22, 2012

(54) METHOD AND APPARATUS FOR TREATING SELENIUM-CONTAINING WASTEWATER

(75) Inventors: Yoshihiro Etou, Tokyo (JP); Hiroyuki Asada, Tokyo (JP); Yu Tanaka, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 653 days.

(21) Appl. No.: 12/308,270

(22) PCT Filed: Jun. 28, 2007

(86) PCT No.: PCT/JP2007/062987
§ 371 (c)(1),
(2), (4) Date: Dec. 19, 2008

(87) PCT Pub. No.: WO2008/004488
PCT Pub. Date: Jan. 10, 2008

(65) Prior Publication Data
US 2010/0230350 A1      Sep. 16, 2010

(30) Foreign Application Priority Data

Jul. 4, 2006 (JP) ................................. 2006-184068
Mar. 9, 2007 (JP) ................................. 2007-060334

(51) Int. Cl.
*B01D 21/00* (2006.01)
(52) U.S. Cl. ........ 210/716; 210/702; 210/723; 210/724; 210/726; 210/911; 423/508; 423/509
(58) Field of Classification Search ............... 210/719
See application file for complete search history.

(56) References Cited

U.S. PATENT DOCUMENTS

| | | | | |
|---|---|---|---|---|
| 3,766,036 A | * | 10/1973 | McKaveney | 205/745 |
| 3,933,635 A | * | 1/1976 | Marchant | 210/719 |
| 4,096,064 A | * | 6/1978 | du Fresne | 210/120 |
| 4,405,464 A | * | 9/1983 | Baldwin et al. | 210/717 |
| 4,806,264 A | * | 2/1989 | Murphy | 210/695 |
| 5,275,737 A | * | 1/1994 | Heskett | 210/638 |
| 5,853,598 A | * | 12/1998 | Ogoshi et al. | 210/724 |
| 6,214,238 B1 | * | 4/2001 | Gallup | 210/717 |
| 6,235,204 B1 | * | 5/2001 | Castaldi et al. | 210/719 |
| 6,797,182 B2 | * | 9/2004 | Vergani et al. | 210/757 |
| 7,833,422 B2 | * | 11/2010 | Akiho et al. | 210/757 |

FOREIGN PATENT DOCUMENTS

| | | |
|---|---|---|
| JP | H06-079286 | 3/1994 |
| JP | H08-224585 | 9/1996 |
| JP | H09-187778 | 7/1997 |
| JP | 2001-025777 | 1/2001 |
| JP | 2001-029965 | 2/2001 |
| JP | 2007-054818 | 3/2007 |

* cited by examiner

*Primary Examiner* — Krishnan S Menon
*Assistant Examiner* — David Weisz
(74) *Attorney, Agent, or Firm* — Manabu Kanesaka

(57) ABSTRACT

A method and an apparatus for treating selenium-containing wastewater, in which wastewater containing hexavalent selenium is subjected to reduction treatment, selenium can be effectively removed at a small amount of metal leached, and, preferably, sludge produced during treatment is white, thereby facilitating the disposal of the sludge. The selenium-containing wastewater is brought into contact with an alloy or a mixture of metallic titanium and a first metal other than metallic titanium to partially leach the first metal, thereby subjecting selenium in the wastewater to reduction treatment.

11 Claims, 1 Drawing Sheet

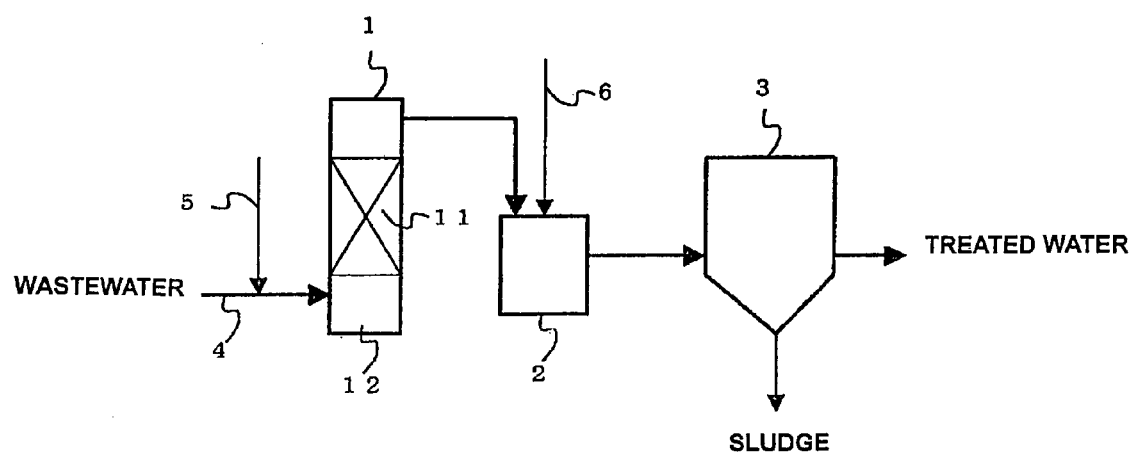

METHOD AND APPARATUS FOR TREATING SELENIUM-CONTAINING WASTEWATER

FIELD OF INVENTION

The present invention relates to a method and an apparatus for treating selenium-containing wastewater. More specifically, the present invention relates to a method and an apparatus for treating selenium-containing wastewater, in which selenium-containing wastewater is subjected to reduction treatment with an alloy or a mixture of metallic titanium and a first metal other than metallic titanium to effectively remove selenium.

BACKGROUND OF INVENTION

Flue-gas desulfurization wastewater from coal fired power plants and wastewater from factories refining nonferrous metals contain selenium in some cases. The wastewater rarely has a high selenium concentration. However, even if the selenium concentration is about several milligrams per liter, selenium needs to be removed from the wastewater for environment conservation.

Hitherto, a method of using divalent iron, a method of using metallic iron, a method of using an aluminum salt or metallic aluminum, and the like have been known as a method for removing selenium from selenium-containing wastewater.

The method of using divalent iron include adding a salt of an acid and divalent iron to selenium-containing wastewater, performing a reaction by adjusting the pH to 8.5 to 10, and then performing solid-liquid separation (for example, Patent Document 1).

The method of using metallic iron include adjusting the pH of selenium-containing wastewater to 5 or less, bringing the wastewater into contact with metallic iron to reduce selenium, performing coagulation treatment, and performing solid-liquid separation (Patent Document 2).

The method of using metallic aluminum include adjusting the pH of selenium-containing wastewater to 6 or less to allow copper ions or iron ions to be present, adding a metal, such as metallic iron or metallic aluminum, to adjust ORP to −350 mV or less, and then adjusting the pH to 8 to 10 to perform solid-liquid separation (Patent Document 3).

In the method of using divalent iron or metallic iron, however, separated sludge is colored. This limits the disposal of the sludge. In the method of using metallic aluminum, even when wastewater is adjusted to be acidic and then brought into contact with metallic aluminum, aluminum is not easily leached. Thus, a desired reduction effect is not achieved.

[Patent Document 1] Japanese Unexamined Patent Application Publication No. 6-79286

[Patent Document 2] Japanese Unexamined Patent Application Publication No. 9-187778

[Patent Document 3] Japanese Unexamined Patent Application Publication No. 8-224585

SUMMARY OF THE INVENTION

It is an object of the present invention to provide a method and an apparatus for treating selenium-containing wastewater, in which when selenium is subjected to reduction treatment with a metal, the required amount of the metal leached can be obtained to reduce and remove selenium stably and reliably. It is another object of the present invention to provide a method and an apparatus for treating selenium-containing wastewater according to an embodiment, in which when sludge is produced, the sludge is white.

A method for treating selenium-containing wastewater according to a first embodiment includes bringing selenium-containing wastewater into contact with an alloy or a mixture of metallic titanium and a first metal other than metallic titanium and partially leaching the first metal to reduce selenium.

According to a second embodiment, the method for treating selenium-containing wastewater according to the first embodiment is characterized in that when the selenium-containing wastewater is brought into contact with the alloy or the mixture of metallic titanium and the first metal, an acid is added to the selenium-containing wastewater.

According to a third embodiment, the method for treating selenium-containing wastewater according to the first or second embodiment is characterized in that after selenium is reduced, the leached metal is precipitated by pH adjustment, and then the precipitated metal is subjected to solid-liquid separation.

According to a fourth embodiment, the method for treating selenium-containing wastewater according to any one of the first to third embodiments is characterized in that the first metal is at least one selected from aluminum, zinc, and tin.

According to a fifth embodiment, the method for treating selenium-containing wastewater according to any one of the first to fourth embodiments is characterized in that at least part of selenium is hexavalent selenium.

According to a sixth embodiment, the method for treating selenium-containing wastewater according to any one of the first to fifth embodiments is characterized in that the selenium-containing wastewater is flue-gas desulfurization wastewater.

According to a seventh embodiment, the method for treating selenium-containing wastewater according to any one of the first to sixth embodiments is characterized in that the selenium-containing wastewater contains fluorine and/or boron, and wherein the first metal is aluminum.

According to an eighth embodiment, the method for treating selenium-containing wastewater according to any one of the first to seventh embodiments is characterized in that the first metal is aluminum, and wherein the ratio of the volume T of metallic titanium to the volume A of aluminum, i.e., T/A, is in the range of 1/3 to 3/1.

An apparatus for treating selenium-containing wastewater according to a ninth embodiment includes a reduction reactor into which selenium-containing wastewater is fed and in which selenium in selenium-containing wastewater is subjected to reduction treatment in the presence of an alloy or a mixture of metallic titanium and a first metal; a coagulation reactor into which the wastewater that has been subjected to the reduction treatment is fed from the reduction reactor; pH-adjuster-adding means for adjusting the pH in the coagulation reactor; and a solid-liquid separator in which the wastewater that has been subjected to coagulation treatment is subjected to solid-liquid separation.

According to a tenth embodiment, the apparatus for treating selenium-containing wastewater according to ninth embodiment is characterized in that the first metal is aluminum, and wherein the ratio of the volume T of metallic titanium to the volume A of aluminum, i.e., T/A, is in the range of 1/3 to 3/1.

ADVANTAGES

In the method for treating selenium-containing wastewater according to the first embodiment, the selenium-containing wastewater is brought into contact with the alloy or mixture of metallic titanium and the first metal. In this case, the reducing ability is improved compared with the case of using the first metal alone or metallic titanium alone. Thus, selenium can be subjected to reduction treatment at a small amount of metal leached. In particular, this method is effective for the treatment of wastewater containing hexavalent selenium. Selenium is reduced to the zero-valent state to be precipitate on the metal surface of the alloy or mixture. Alternatively, selenium is reduced to a tetra- or lower valent state and thus has a form that is easily precipitated.

According to the second embodiment, the addition of the acid promotes the leaching of the first metal coexisting with metallic titanium, thereby providing the amount of leached metal required for the reduction of selenium.

According to the third embodiment, the reduction-treated water is subjected to the pH adjustment so as to precipitate the leached metal and then subjected to solid-liquid separation. When the metal is precipitated, part of lower-valent selenium remaining in the reduction-treated water is coprecipitated with the metal. The coprecipitate is removed from the treated water by solid-liquid separation, thus affording treated water from which selenium and metals are removed.

According to the fourth embodiment, aluminum, zinc, or tin is used as the metal coexisting with metallic titanium; hence, a desired amount of metal leached can be obtained. Furthermore, unlike colored sludge in the case of using iron, sludge produced by the pH adjustment after leaching is white. Thus, in a workplace where flue gases are desulfurized by a lime-gypsum method, the sludge can be mixed with recovered gypsum and recovered.

According to the fifth embodiment, the selenium-containing wastewater contains hexavalent selenium. Since a sufficient amount of metal leached can be obtained and the reducing power is strong, hexavalent selenium can be reduced. Although hexavalent selenium is not easily reduced to a lower-valent state with a common reductant, e.g., a divalent iron salt or hydrazine, according to the present invention, hexavalent selenium can also be reduced.

According to the sixth embodiment, flue-gas desulfurization wastewater can be effectively treated by the present invention. The flue-gas desulfurization wastewater contains selenium. Selenium is reduced and removed by the present invention. The use of aluminum, zinc, or tin as the first metal according to the fourth embodiment of the present application results in the formation of white sludge. The white sludge can be mixed with a large amount of gypsum from a flue-gas desulfurizer that produces flue-gas desulfurization wastewater, facilitating the disposal of the sludge.

According to the seventh embodiment, in the case where selenium-containing wastewater contains fluorine and/or boron, selenium, fluorine, and boron can be simultaneously insolubilized by reducing selenium with leached aluminum and then precipitating the leached aluminum, thereby eliminating the need to provide a separate wastewater treatment unit for removing fluorine and boron.

In the apparatus for treating selenium-containing wastewater according to the ninth embodiment, the selenium-containing wastewater is brought into contact with the alloy or mixture of metallic titanium and the first metal. In this case, the reducing ability is improved compared with the case of using the first metal alone or metallic titanium alone. Thus, selenium can be subjected to reduction treatment at a small amount of metal leached. In particular, this method is effective for the treatment of wastewater containing hexavalent selenium. Selenium is reduced to the zero-valent state to be precipitate on the metal surface of the alloy or mixture. Alternatively, selenium is reduced to a tetra- or lower valent state and thus has a form that is easily precipitated. The reduction-treated water is subjected to the pH adjustment so as to precipitate the leached metal and then subjected to solid-liquid separation. When the metal is precipitated, part of lower-valent selenium remaining in the reduction-treated water is coprecipitated with the metal. The coprecipitate is removed from the treated water by solid-liquid separation, thus affording treated water from which selenium and metals are removed.

BRIEF DESCRIPTION OF DRAWING

FIG. 1 is a system diagram of an apparatus for treating selenium-containing wastewater according to an embodiment of the present invention.

DETAILED DESCRIPTION

A method and an apparatus for treating selenium-containing wastewater according to an embodiment of the present invention will be described in detail below.

In the present invention, selenium-containing wastewater, which is a treatment target, contains hexavalent selenium such as selenic acid and tetravalent selenium such as selenious acid as selenium. Examples of the selenium-containing wastewater include refining wastewater from processes for refining nonferrous metals; flue-gas desulfurization wastewater from flue-gas desulfurization processes for desulfurizing coal combustion gases; and industrial wastewater from factories using selenium as a raw material and an additive.

The selenium-containing wastewater may contain fluorine and/or boron. An example of the wastewater is flue-gas desulfurization wastewater.

In the present invention, selenium-containing wastewater is brought into contact with an alloy or a mixture of metallic titanium and a first metal other than titanium to partially dissolve the first metal, thereby reducing selenium. Most of reduced selenium is precipitated on metal surfaces. Thus, the wastewater subjected to the reduction treatment may be defined as treated water. After the reduction treatment, the pH is adjusted to precipitate the dissolved metal as needed. Then the wastewater is subjected to solid-liquid separation to remove the precipitated metal, thereby affording treated water.

In the reduction treatment, the alloy or the mixture of metallic titanium and the first metal is used. As the metal alloyed or mixed with metallic titanium, various metals may be used. It is preferred to use a metal such that sludge of a hydroxide formed by adjusting the pH after the dissolution of the metal is white. The white sludge is easily disposed of compared with colored sludge such as brown sludge. Examples of a metal that can form white sludge include aluminum, zinc, tin, and copper, which can be used. In particular, aluminum, zinc, and tin are also excellent in solubility. These metals can be suitably used in the present invention. The first metal may be a single-element metal alone or may be a mixture or an alloy of two or more metals.

Any of solid solutions, intermetallic compounds, and covalent alloys may be used as the alloy of metallic titanium and the first metal used in the present invention. Examples of a method for making an alloy include a method of utilizing the difference in ionization tendency between metals; an electrolytic method; and melting method, which can be employed.

In the present invention, metallic titanium and the first metal may not be alloyed but may be used as a mixture. Metallic titanium having, for example, a powdery, granular, or fibrous shape is mixed with the first metal having, for example, a powdery, granular, or fibrous shape to form a mixture. Metallic titanium and the first metal may have the same or different shapes.

The alloy or the mixture of titanium and the first metal preferably has a shape having a large surface area. For example, the alloy or the mixture thereof is used as, for example, a powder, granules, fibers, minute thin films having a particle size of about 10 μm to about 5 mm.

A method for bringing selenium-containing wastewater into contact with the alloy or the mixture of titanium and the first metal is not limited. The contact can be performed with any type of a reduction reactor. The reduction reactor may be a reduction reaction tank to which selenium-containing wastewater is fed and the alloy or mixture having a powdery or fine granular shape is added. Alternatively, the reduction reactor may be a packed tower that is packed with the alloy or mixture having, for example, a granular or fibrous shape and that has a packed bed through which the wastewater is passed.

When selenium-containing wastewater is brought into contact with the alloy or mixture of metallic titanium and the first metal, the first metal is leached out and dissolved in the wastewater. A strong reducing action occurs when the metal is leached out to ionize, thereby reducing selenium in the wastewater. It takes a long time to leach out the metal. Thus, preferably, the leaching of the metal is promoted by adding an acid to the selenium-containing wastewater. Examples of the acid added include hydrochloric acid and sulfuric acid. The amount of the acid added is preferably determined in response to the amount of the metal leached. The amount of the metal leached is approximately proportional to the amount of the acid added. The amount of the acid added can be determined using a relational expression determined by an experiment in advance. Furthermore, the amount of the metal leached can be determined in response to the concentration of hexavalent selenium to be subjected to reduction treatment.

Metals other than selenium leached out in selenium-containing wastewater, for example, aluminum and zinc, are believed to react with selenic acid ions as the following reaction formulae to reduce selenium:

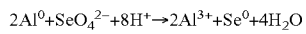

$$2Al^0 + SeO_4^{2-} + 8H^+ \rightarrow 2Al^{3+} + Se^0 + 4H_2O$$

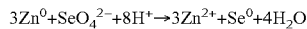

$$3Zn^0 + SeO_4^{2-} + 8H^+ \rightarrow 3Zn^{2+} + Se^0 + 4H_2O$$

In the present invention, in the case where the wastewater is brought into contact with the alloy or mixture of metallic titanium and the first metal, selenium reduction performance is significantly improved, compared with treatment in which one of metallic titanium and the first metal is brought into contact with the wastewater. The reason for this is as follows: Metals other than titanium, e.g., aluminum and zinc, are dissolved. Electrons are transferred through titanium, which is practically insoluble even in the presence of an acid. Selenium is reduced on the surface of titanium. At this point, some electrical effect is likely to occur.

The ratio of the volume T of metallic titanium to the volume M of the first metal, i.e., T/M, is preferably 1/3 or more and particularly 1/2 or more. A ratio T/M of 1/3 or more results in satisfactory selenium reduction performance. This is probably because a high metallic titanium content results in an increase in the amount of electrons produced by the dissolution of the first metal and then transferred to the surface of metallic titanium, thereby increasing the amount of selenium reduced on the surface of metallic titanium. In contrast, a ratio T/M of less than 1/3 results in an increase in the amount of electrons produced by the dissolution of the first metal and then released on the surface of the first metal due to a low metallic titanium content and a reduction in the amount of electrons transferred to the surface of metallic titanium to contribute to the reduction of selenium. Thus, the selenium reduction performance can be reduced.

In the case where the volume of the first metal is fixed and where the ratio T/M is increased, although satisfactory reduction performance is maintained, a large amount of metallic titanium is required. In addition, an apparatus into which the first metal and the metallic titanium are fed is required to have a large capacity. Thus, the ratio T/M is preferably 3/1 or less and particularly 1/1 or less. More preferably, the ratio T/M is in the range of 1/3 to 3/1 and particularly 1/2 to 1/1.

In the present invention, the first metal is preferably aluminum. In the case where the ratio of the volume T of metallic titanium to the volume A of aluminum, i.e., T/A, is in the range of 1/3 to 3/1 and particularly 1/2 to 2/1, selenium can be removed with extremely high efficiency.

Selenium, e.g., hexavalent selenium is mostly reduced to zero-valent selenium. Reduced selenium is precipitated on the surface of titanium of the alloy or mixture. Thereby, selenium is removed from wastewater. The remaining selenium is reduced from the hexavalent state to a lower valent state, e.g., the tetravalent state, and then subjected to coagulation treatment, resulting in an easily precipitable form.

In the present invention, preferably, after selenium-containing wastewater is subjected to reduction treatment, the reduction-treated water is subjected to coagulation treatment. The coagulation treatment is performed by adjusting the pH of the reduction-treated water to precipitate the leached metal as an insoluble compound such as a hydroxide and subjecting the precipitated metal compound to solid-liquid separation.

The pH of the reduction-treated water is usually adjusted by adding an alkali, such as sodium hydroxide, potassium hydroxide, or slaked lime. In the case where a metal used together with metallic titanium is aluminum, the alkali is added to the reduction-treated water to precipitate dissolved aluminum as aluminum hydroxide. The pH is preferably adjusted to 5 to 8 by the addition of the alkali. A pH of 4 or less or 9 or more is not suitable because aluminum hydroxide is dissolved. In the case where a metal used together with metallic titanium is zinc, the pH is adjusted to 9 to 10 to precipitate zinc as zinc hydroxide. In the case of tin, the pH is adjusted to about 8 to precipitate tin as tin hydroxide.

When a metal compound is precipitated by the pH adjustment, an organic flocculant or an inorganic coagulant is added to improve solid-liquid separation properties.

To separate the precipitated metal compound from wastewater, solid-liquid separation is performed. The solid-liquid separation can be performed by any method commonly employed. Treated water is separated from sludge formed of an insoluble metal compound by precipitation, filtration, centrifugation, membrane separation, or the like.

The pH adjustment and the solid-liquid separation of the reduction-treated water result in the insolubilization of the metal leached during reduction treatment and result in the separation of the insolubilized metal from the wastewater. The resulting treated water can be discharged as treated water free from metals. When the leached metal is precipitated as an insoluble compound such as aluminum hydroxide, reduced low-valent selenium remaining in the wastewater is adsorbed on aluminum hydroxide flocs and precipitated by a coprecipitation phenomenon.

For selenium-containing wastewater containing fluorine and/or boron, in the case where aluminum is selected as a metal used together with metallic titanium, when aluminum hydroxide is precipitated by pH adjustment after the reduction treatment, fluorine and/or boron is also precipitated by a coprecipitation phenomenon.

In the present invention, another preferred method of precipitating dissolved aluminum is a method of precipitating dissolved aluminum as calcium aluminate. A calcium compound is added to reduction-treated water. Coagulation treatment is performed by adjusting the pH to 9 or more. Examples of the calcium compound added include calcium hydroxide, calcium oxide, and calcium chloride. In the case of using calcium hydroxide, calcium hydroxide serves as a calcium source and an alkali for the pH adjustment and is thus preferred. In the case of using another calcium compound, any alkali is added to adjust the pH. The pH is adjusted to 9 or more and preferably 9 to 12. A pH of less than 9 results in difficulty in forming calcium aluminate.

In this way, when dissolved aluminum is precipitated as calcium aluminate, reduced low-valent selenium in the reduction-treated water is adsorbed on calcium aluminate flocs and precipitated by the coprecipitation phenomenon.

In the coagulation and precipitation, the following reaction is presumed to occur.

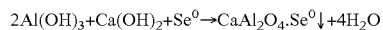

$$2Al(OH)_3 + Ca(OH)_2 + Se^0 \rightarrow CaAl_2O_4 \cdot Se^0 \downarrow + 4H_2O$$

The method of removing selenium by coprecipitation with calcium aluminate has a higher selenium-removing effect than the selenium-removing effect in the case of using aluminum hydroxide. The reason for this is not clear. It is presumed that insufficiently reduced selenium is also removed by calcium aluminate.

Furthermore, in the case where selenium-containing wastewater contains fluorine and boron, fluorine and boron are precipitated simultaneously with the precipitation of calcium aluminate. Thus, applying the precipitation method to wastewater containing selenium, fluorine, and boron, for example, flue-gas desulfurization wastewater is significantly preferred.

In the present invention, wastewater is subjected to reduction treatment, pH adjustment for the precipitation of the metal, and solid-liquid separation and thus separated into treated water, a precipitated metal compound, and selenium-containing sludge optionally containing fluorine and boron. In the case where a metal used together with metallic titanium is selected in such a manner that sludge produced by solid-liquid separation is white, the resulting sludge can be mixed with gypsum produced in a flue-gas desulfurizer and recovered, thereby facilitating the disposal of the sludge.

An apparatus for treating selenium-containing wastewater according to the present invention will be described below.

FIG. 1 shows an apparatus for treating selenium-containing wastewater according to an embodiment of the present invention. Reference numeral 1 denotes a reduction reactor, reference numeral 2 denotes a coagulation reactor, reference numeral 3 denotes a solid-liquid separator, reference numeral 4 denotes a wastewater feed pipe for feeding selenium-containing wastewater into the reduction reactor, reference numeral 5 denotes an acid-adding unit, and reference numeral 6 denotes pH-adjuster-adding means.

The reduction reactor 1 is a packed tower packed with an alloy or a mixture of metallic titanium and a first metal other than metallic titanium. A support plate is arranged at a lower portion in the tower. Particles of the alloy or mixture are provided on the support plate to form a metal packed bed 11. The support plate has a structure that permits water to pass therethrough and blocks the passage of the metal particles. A perforated plate or a strainer is used as the support plate. As described above, it is preferred that the first metal be aluminum and the volume ratio T/A of metallic titanium to aluminum be in the range of 1/3 to 3/1 and particularly 1/2 to 2/1.

A wastewater admission chamber 12 is arranged under the support plate. The wastewater admission chamber 12 communicates with the wastewater feed pipe 4. A reduction-treated water chamber is arranged above the metal packed bed 11. The reduction-treated water chamber communicates with a duct for feeding the reduction-treated water into the subsequent stage. An upper support plate may be arranged on or near the upper surface of the packed bed.

The acid-adding unit 5 is connected to the wastewater feed pipe 4 and can add an acid to wastewater. Alternatively, the acid-adding unit need not be connected to the wastewater feed pipe 4 but may be arranged so as to add an acid to the wastewater admission chamber 12.

The reduction reactor 1 is preferably an airtight reaction vessel in order that a reduction reaction can occur under a reducing atmosphere in the reactor.

The reduction reactor 1 is provided with an openable and closable port for charging the alloy or mixture at any position, for example, at an upper wall of the reactor. Thus, the metal can be charged into the reactor at any time.

Heating means for heating wastewater in the reduction reactor 1 or the wastewater feed pipe 4 is preferably arranged. For example, a steam injection pipe, a heating jacket, or a heater may be attached at any position. Alternatively, a heat exchanger may be attached to the wastewater feed pipe.

The coagulation reactor 2 may be a common used coagulation reactor. The coagulation reactor 2 communicates with a conduit for feeding reduction-treated water from the reduction reactor 1 thereinto and the pH-adjuster-adding means 6 for adding a pH adjuster. An agitator is arranged in the reactor 2 in order to allow coagulation reactions to occur uniformly. The reactor 2 communicates with a conduit for feeding wastewater that has been subjected to coagulation treatment into the solid-liquid separator 3.

The solid-liquid separator 3 communicates with a treated water duct for discharging treated water resulting from solid-liquid separation and with a sludge discharge pathway for discharging separated sludge. The solid-liquid separator 3 shown in FIG. 1 is a sedimentation tank. Alternatively, another solid-liquid separator such as a membrane separator may be used.

A second flocculation reactor (not shown) may be arranged between the coagulation reactor 2 and the solid-liquid separator. A polymer flocculant is added to the second flocculation reactor to increase the size of fine flocs formed in the coagulation reactor 2.

A method for treating selenium-containing wastewater with the apparatus having the structure shown in FIG. 1 will be described below. In the description, the metal packed bed 11 is packed with a mixture of granular metallic titanium and granular metallic aluminum in the reduction reactor 1.

Selenium-containing wastewater is mixed with an acid fed from the acid-adding unit 5 and then fed into the reduction reactor 1 through the wastewater feed pipe 4. In the case of the selenium-containing wastewater containing pollutants such as suspended matter, heavy metals other than selenium, and organic matter, preferably, the wastewater is passed through a pretreatment unit (not shown), e.g., a coagulation/flocculation unit, a filter, a membrane separator, or an activated-carbon adsorption unit, to remove coexisting pollutants before the wastewater is fed into the reduction reactor.

The wastewater fed into the wastewater admission chamber 12 of the reduction reactor 1 flows upward through the reduction reactor 1 and comes into contact with the metal packed bed 11. At this point, the acid added to the wastewater promotes the dissolution of metallic aluminum. With respect to metallic aluminum, aluminum is smoothly leached out in response to the amount of the acid present. This leaching provides a reducing power. Selenium, in particular, hexavalent selenium in the wastewater is reduced using the reducing power provided by the leaching of aluminum. Selenium is reduced into the tetravalent state to the zero-valent state. Most of reduced zero-valent selenium is presumed to be precipitated on the surface of metallic titanium in the metal packed bed 11.

The reaction temperature and the flow rate of the wastewater are not particularly limited. A higher temperature and a lower flow rate result in a lower selenium concentration in the treated water. Thus, the wastewater is preferably heated to about 50° C. to about 70° C. In addition, the flow rate in terms of SV is preferably in the range of 1 to 30 (1/h).

The resulting reduction-treated water partially containing reduced selenium is transferred from the reduction-treated water chamber located at the upper portion of the reduction reactor 1 to the coagulation reactor 2 through the duct. The reduction-treated water in the coagulation reactor 2 is supplied with an alkali from the pH-adjuster-adding means 6. They are mixed by stirring. The pH of the mixed water is adjusted to 5 to 8 by the supply of the alkali, so that dissolved aluminum is precipitated as aluminum hydroxide. At this point, selenium in the water is adsorbed and coprecipitated. Thereby, selenium is insolubilized. Furthermore, in the case where the selenium-containing wastewater contains fluorine, dissolved aluminum reacts with fluorine to insolubilize fluorine. Then the resulting insoluble fluorine is precipitated together with hydroxide flocs.

Preferably, the treated water that has been subjected to coagulation treatment in the coagulation reactor 2 is transferred into the solid-liquid separator 3 through the conduit after the flocs are increased in size with a polymer flocculant. In the sedimentation tank, which is the solid-liquid separator 3, selenium that has been insolubilized and coprecipitated with the aluminum compound is sedimented and discharged as sludge through the sludge discharge pathway located at the bottom of the sedimentation tank 3. The resulting supernatant water in the upper portion of the sedimentation tank is drained as treated water through the treated water conduit. The treated water is subjected to post-treatment, e.g., pH adjustment, removal of remaining suspended matter, or removal of the remaining COD, as needed, and then released or recovered.

The separated sludge is subjected to dehydration with a dehydrator and then disposed. The sludge produced in the present invention is white when aluminum, zinc, tin, or the like is used as the first metal. Thus, the separated sludge can be mixed with a gypsum slurry from a flue-gas desulfurizer, and then the resulting mixture can be dehydrated with a dehydrator and recovered, thereby facilitating the disposal of the sludge.

EXAMPLES

While examples and comparative examples of the present invention will be described below, the present invention is not limited to the examples without departing from the scope of the invention.

Examples 1 to 3

Sodium selenate ($Na_2SeO_4$) and anhydrous sodium sulfate were dissolved in ultrapure water to prepare synthetic wastewater having a Se(VI) content of about 1 mg/L and a $SO_4$ content of about 1,000 mg/L. A metal mixture (indicated by Al/Ti in Table 1) in which 25 mL (36 g) of metallic titanium having a grain size of 2 to 5 mm and a purity of 99% or more and 50 mL (87 g) of metallic aluminum having a grain size of 1 to 2 mm and a purity of 99.5% were uniformly mixed was prepared and packed into a glass column having an inner diameter of 25 mm. Different amounts of hydrochloric acid were added to the synthetic wastewater. The resulting wastewater was subjected to reduction treatment by passing the wastewater through the glass column at a flow rate in terms of SV of 5 (1/h) while the wastewater was being heated at 60° C. Then sodium hydroxide was added to the effluent from the outlet of the column to adjust the pH to about 7. After a reaction was performed for 10 minutes, the resulting water was filtered through No. 5C filter paper. The quality of the effluent from the column outlet and the filtrate were measured. The results are shown in Table 1 as Examples 1 to 3. The volume ratio T/A of metallic titanium to metallic aluminum of the metal mixture was 1/2.

Examples 4 to 6

Tests were performed as in Examples 1 to 3, except that a mixture (hereinafter, referred to as "Zn/Ti") in which 25 mL (36 g) of metallic titanium having a grain size of 2 to 5 mm and a purity of 99% or more and 50 mL (181 g) of metallic zinc having a grain size of 1 to 2 mm and a purity of 99.5% were uniformly mixed was used in place of the metal mixture used in Examples 1 to 3 and that the pH was adjusted to 10 after the reduction treatment. Table 1 shows the results.

Comparative Examples 1 and 2

Tests were performed as in Examples 1 to 3, except that metallic aluminum having a grain size of 1 to 2 mm and a purity of 99.5% was used as the metal packed in the glass column. Table 1 shows the results.

Comparative Examples 3 and 4

Tests were performed as in Examples 4 to 6, except that metallic zinc having a grain size of 1 to 2 mm and a purity of 99.5% was used as the metal packed in the glass column. Table 1 shows the results.

Comparative Examples 5 and 6

Tests were performed as in Examples 4 to 6, except that metallic titanium having a grain size of 2 to 5 mm and a purity of 99% or more was used as the metal packed in the glass column. Table 1 shows the results.

TABLE 1

| | Metal species | Amount of HCl added (mg/l) | Raw wastewater Se concentration (mg/l) | Effluent from column outlet | | | | Treated water Se concentration (mg/l) | T/A |
|---|---|---|---|---|---|---|---|---|---|
| | | | | Se concentration (mg/l) | Al concentration (mg/l) | Zn concentration (mg/l) | Ti concentration (mg/l) | | |
| Example 1 | Al/Ti | 35 | 0.86 | 0.58 | 6.7 | — | ≦0.1 | 0.56 | 1/2 |
| Example 2 | Al/Ti | 100 | 0.91 | Unmeasured | 21.1 | — | ≦0.1 | 0.34 | 1/2 |
| Example 3 | Al/Ti | 200 | 0.91 | 0.05 | 46 | — | ≦0.1 | 0.03 | 1/2 |
| Example 4 | Zn/Ti | 35 | 0.86 | 0.28 | — | 28 | ≦0.1 | 0.28 | 1/2 |
| Example 5 | Zn/Ti | 100 | 0.91 | 0.09 | — | 78.4 | ≦0.1 | 0.07 | 1/2 |
| Example 6 | Zn/Ti | 200 | 0.91 | 0.01 | — | 158 | ≦0.1 | ≦0.01 | 1/2 |
| Comparative Example 1 | Al | 200 | 0.91 | Unmeasured | 49.8 | — | — | 0.88 | |
| Comparative Example 2 | Al | 500 | 0.97 | 0.95 | 123 | — | — | 0.88 | |
| Comparative Example 3 | Zn | 200 | 0.91 | Unmeasured | — | 167 | — | 0.74 | |
| Comparative Example 4 | Zn | 500 | 0.97 | 0.25 | — | 440 | — | 0.21 | |
| Comparative Example 5 | Ti | 200 | 0.91 | 0.91 | — | — | ≦0.1 | 0.91 | |
| Comparative Example 6 | Ti | 500 | 0.96 | 0.96 | — | — | 0.73 | 0.9 | |

In each of Examples 1 to 6 and Comparative Examples 1 to 6, the treated water had an Al concentration of 1 mg/L or less, a zinc concentration of 1 mg/L or less, and a titanium concentration of 0.1 mg/L or less.

As shown in Table 1, in each of Examples in which the synthetic wastewater containing hexavalent selenium was brought into contact with the mixtures of metallic titanium and a first metal other than metallic titanium (aluminum or zinc), the treated water had a low selenium concentration, and the effluent from the column outlet had low aluminum and zinc concentrations. In contrast, in each of Comparative Examples in which the metal, i.e., aluminum, zinc, or titanium, was used alone, the treated water had a high selenium concentration (Comparative Examples 1 to 3, 5, and 6) despite a high metal concentration in the effluent from the column outlet. That is, in Examples 1 to 6, the selenium concentration can be reduced at a small amount of the metal leached.

Example 7

First, 21.8 g of tin chloride ($SnCl_2.2H_2O$) was dissolved in diluted hydrochloric acid (solution prepared by adding 17 mL of concentrated hydrochloric acid to 300 mL of ultrapure water). The resulting solution was added to 87 g (50 mL) of metallic aluminum having a grain size of 1 to 2 mm and a purity of 99.5% under stirring to deposit metallic tin on surfaces of the aluminum granules, thereby preparing Al—Sn granules. The Al—Sn granules and 36 g (25 mL) of metallic titanium having a grain size of 2 to 5 mm and a purity of 99% or more were uniformly mixed, and the resulting mixture was packed into a glass column. Hydrochloric acid was added to flue-gas desulfurization wastewater containing 1.09 mg/L of selenium in such a manner that the resulting mixture had a hydrochloric acid concentration of 300 mg/L. The resulting mixture was passed through the column at a flow rate in terms of SV of 5 (1/h) while being heated at 60° C. Sodium hydroxide was added to the effluent from the outlet of the column to adjust the pH to about 7. After a reaction was performed for 10 minutes, the resulting water was filtered through No. 5C filter paper.

The resulting treated water had a selenium concentration of 0.32 mg/L. The effluent from the column outlet had an aluminum concentration of 59.3 mg/L.

Comparative Example 7

Wastewater was passed under the same conditions as in Example 7, except that only the same Al—Sn alloy as used in Example 7 was packed into the glass column. The resulting treated water had a selenium concentration of 0.61 mg/L, which was about twice that in Example 7. The effluent from the column outlet had an aluminum concentration of 60.0 mg/L.

Example 8

The same Al/Ti metal mixture as used in Example 1 was packed into a glass column. Hydrochloric acid was added to flue-gas desulfurization wastewater containing 1.16 mg/L of selenium and 30.2 mg/L of fluorine in such a manner that the resulting mixture had a hydrochloric acid concentration of 900 mg/L. The resulting mixture was passed through the column at a flow rate in terms of SV of 5 (1/h) while being heated at 60° C. Sodium hydroxide was added to the effluent from the outlet of the column to adjust the pH to about 7. After a reaction was performed for 10 minutes, the resulting water was filtered through No. 5C filter paper.

The resulting treated water had a selenium concentration of 0.01 mg/L or less and a fluorine concentration of 5.6 mg/L. Produced sludge was white, which was the same color as gypsum produced from a flue-gas desulfurizer. Although the effluent from the column outlet had an Al concentration of 218 mg/L, the resulting treated water had an Al concentration of 1 mg/L or less.

Example 9

First, 12.5 ml (18.0 g) of metallic titanium having a grain size of 2 to 5 mm and a purity of 99% or more was mixed with 50 ml (87.0 g) of metallic aluminum having a grain size of 1 to 2 mm and a purity of 99.5%. The resulting mixture was packed into a column having an inner diameter of 25 mm. The volume ratio T/A of titanium to aluminum was 1/4.

Hydrochloric acid was added to flue-gas desulfurization wastewater containing 1.11 mg/l of selenium in such a manner that the resulting mixture had a hydrochloric acid concentration of 300 mg/l. The resulting mixture was passed through the column at a flow rate of 250 ml/h while being heated at 60° C. Caustic soda was added to the effluent from the outlet of the column to adjust the pH to about 7. After a reaction was performed for 10 minutes, the resulting water was filtered through No. 5C filter paper. Table 2 shows the measurement results of the selenium and aluminum concentrations of the effluent from the column outlet and the selenium concentration in the treated water.

Examples 10, 11, and 12

Tests were performed under the same conditions as in Example 9, except that the amount of metallic aluminum was not changed, the amount of metallic titanium was increased as shown in Table 2, and the volume ratio T/A was as follows.

Table 2 shows the measurement results of the selenium and aluminum concentrations of the effluent from the column outlet and the selenium concentration in the treated water.

Comparative Example 8

Tests were performed under the same conditions as in Example 9, except that the amount of metallic titanium was zero.

Table 2 shows the measurement results of the selenium and aluminum concentrations of the effluent from the column outlet and the selenium concentration in the treated water.

Comparative Example 9

Tests were performed under the same conditions as in Example 9, except that the amount of metallic aluminum was zero and the amount of metallic titanium was 50.0 ml (72.0 g).

Table 2 shows the measurement results of the selenium and aluminum concentrations of the effluent from the column outlet and the selenium concentration in the treated water.

TABLE 2

| No. | Volume of metallic titanium (ml) | Volume of metallic aluminum (ml) | T/A | Se concentration in effluent from column outlet (mg/l) | Al concentration in effluent from column outlet (mg/l) | Se concentration in filtrate (mg/l) |
| --- | --- | --- | --- | --- | --- | --- |
| Comparative Example 8 | 0 | 50 | 0 | 1.09 | 65.8 | 1.09 |
| Example 9 | 12.5 | 50 | 1/4 | 0.63 | 65.6 | 0.59 |
| Example 10 | 25.0 | 50 | 1/2 | 0.25 | 67.4 | 0.24 |
| Example 11 | 50.0 | 50 | 1/1 | 0.24 | 68.5 | 0.20 |
| Example 12 | 100.0 | 50 | 2/1 | 0.24 | 68.3 | 0.21 |
| Comparative Example 9 | 50.0 | 0 | — | 1.11 | 0.0 | 1.10 |

As shown in Table 2, in each of Examples 9 to 12, the effluent from the column outlet and the filtrate had low selenium concentrations compared with Comparative Examples 8 and 9. In particular, in each of Examples 10 to 12 in which the T/A values were set in the range of 1/2 to 2/1, the resulting selenium concentrations were sufficiently low.

The invention claimed is:

1. A method for treating selenium-containing wastewater, comprising:
   contacting selenium-containing wastewater with a mixture of a metallic titanium particle and a particle of at least one metal selected from the group consisting of aluminum, zinc, and tin;
   partially leaching the at least one metal and reducing selenium; and
   adding an acid to the selenium-containing wastewater when contacting the selenium-containing wastewater with the mixture.

2. The method for treating selenium-containing wastewater according to claim 1, further comprising
   precipitating the at least one metal by a pH adjustment, and
   separating a solid material and a liquid material obtained in the precipitating of the at least one metal after the reducing of the selenium.

3. The method for treating selenium-containing wastewater according to claim 1, wherein at least part of selenium is hexavalent selenium.

4. The method for treating selenium-containing wastewater according to claim 1, wherein the selenium-containing wastewater is flue-gas desulfurization wastewater.

5. The method for treating selenium-containing wastewater according to claim 1,
   wherein the selenium-containing wastewater contains at least one of fluorine and boron, and
   wherein the at least one metal is aluminum.

6. The method for treating selenium-containing wastewater according to claim 1,
   wherein the at least one metal is aluminum, and
   wherein a ratio T/A, where a volume T of metallic titanium to a volume A of aluminum, is in a range of 1/3 to 3/1.

7. The method for treating selenium-containing wastewater according to claim 2, wherein pH is adjusted to 5-8 for the pH adjustment.

8. The method for treating selenium-containing wastewater according to claim 2, wherein pH is adjusted to 9-10 for the pH adjustment when the at least one metal is zinc.

9. The method for treating selenium-containing wastewater according to claim 2, further comprising adding a calcium compound to a solution containing reduced selenium obtained in the reducing of the selenium and adjusting pH of the solution to 9 or higher.

10. The method for treating selenium-containing wastewater according to claim 6, wherein the ratio T/A is in the range of 1/2 to 2/1.

11. The method for treating selenium-containing wastewater according to claim 1, wherein a particle size of the titanium and the at least one metal is from 10 μm to 5 mm.

* * * * *